(12) United States Patent
Koffman

(10) Patent No.: US 10,797,975 B2
(45) Date of Patent: Oct. 6, 2020

(54) APPARATUS, SYSTEM AND METHOD OF A WIRELESS COMMUNICATION MULTI-STREAM SNIFFER

(71) Applicant: INTEL CORPORATION, Santa Clara, CA (US)

(72) Inventor: Liad Koffman, Maaleh-Adumim (IL)

(73) Assignee: INTEL CORPORATION, Santa Clara, CA (US)

( * ) Notice: Subject to any disclaimer, the term of this patent is extended or adjusted under 35 U.S.C. 154(b) by 45 days.

(21) Appl. No.: 16/143,514

(22) Filed: Sep. 27, 2018

(65) Prior Publication Data
US 2020/0106684 A1   Apr. 2, 2020

(51) Int. Cl.
*H04L 12/26* (2006.01)
*H04L 12/851* (2013.01)
*H04W 24/06* (2009.01)
*H04W 8/00* (2009.01)
*H04W 24/08* (2009.01)

(52) U.S. Cl.
CPC .......... *H04L 43/067* (2013.01); *H04L 43/062* (2013.01); *H04L 43/12* (2013.01); *H04L 47/2441* (2013.01); *H04W 24/08* (2013.01); *H04W 8/005* (2013.01)

(58) Field of Classification Search
CPC ..... H04L 43/067; H04L 43/12; H04L 43/062; H04L 47/2441; H04W 24/08; H04W 8/005
See application file for complete search history.

(56) References Cited

U.S. PATENT DOCUMENTS

| 6,483,812 B1* | 11/2002 | Prorock | H04L 12/433 370/252 |
| 7,856,209 B1* | 12/2010 | Rawat | G01S 5/02 455/67.11 |
| 2014/0254389 A1* | 9/2014 | Van Nee | H04W 24/08 370/241 |

(Continued)

OTHER PUBLICATIONS

IEEE Std 802.111™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

(Continued)

*Primary Examiner* — Jianye Wu
(74) *Attorney, Agent, or Firm* — Shichrur & Co.

(57) ABSTRACT

For example, a wireless communication multi-stream sniffer may configure a plurality of wireless communication sniffers to sniff a respective plurality of wireless streams by configuring the plurality of wireless communication sniffers according to a respective plurality of stream configurations; process a plurality of sniffer streams from the plurality of wireless communication sniffers, a sniffer stream from a wireless communication sniffer of the plurality of wireless communication sniffers including frame information of frames captured by the wireless communication sniffer according to a stream configuration of the wireless communication sniffer; and generate a unified sniffer stream by combining the plurality of sniffer streams based on the plurality of stream configurations.

23 Claims, 6 Drawing Sheets

(56) References Cited

U.S. PATENT DOCUMENTS

2014/0307602 A1* 10/2014 Seok ...................... H04L 47/58
370/311

OTHER PUBLICATIONS

IEEE P802.11ax™/D2.0. Draft Standard for Information technology—Telecommunications and information exchange between systems Local and metropolitan area networks—Specific requirements. Part 11: Wireless LAN Medium Access Control (MAC) and Physical Layer (PHY) Specifications, Amendment 6: Enhancements for High Efficiency WLAN, Oct. 2017, 596 pages.

* cited by examiner

Fig. 4

APPARATUS, SYSTEM AND METHOD OF A WIRELESS COMMUNICATION MULTI-STREAM SNIFFER

TECHNICAL FIELD

Embodiments described herein generally relate to a wireless communication multi-stream sniffer.

BACKGROUND

A sniffer may be configured to capture data transmitted over a network and decode the data into a format, which may be readable for humans.

A Wireless sniffer may be configured to capture data transmitted over a wireless medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic illustration of a snapshot of a unified sniffer stream, in accordance with some demonstrative embodiments.

DETAILED DESCRIPTION

Figure 1:
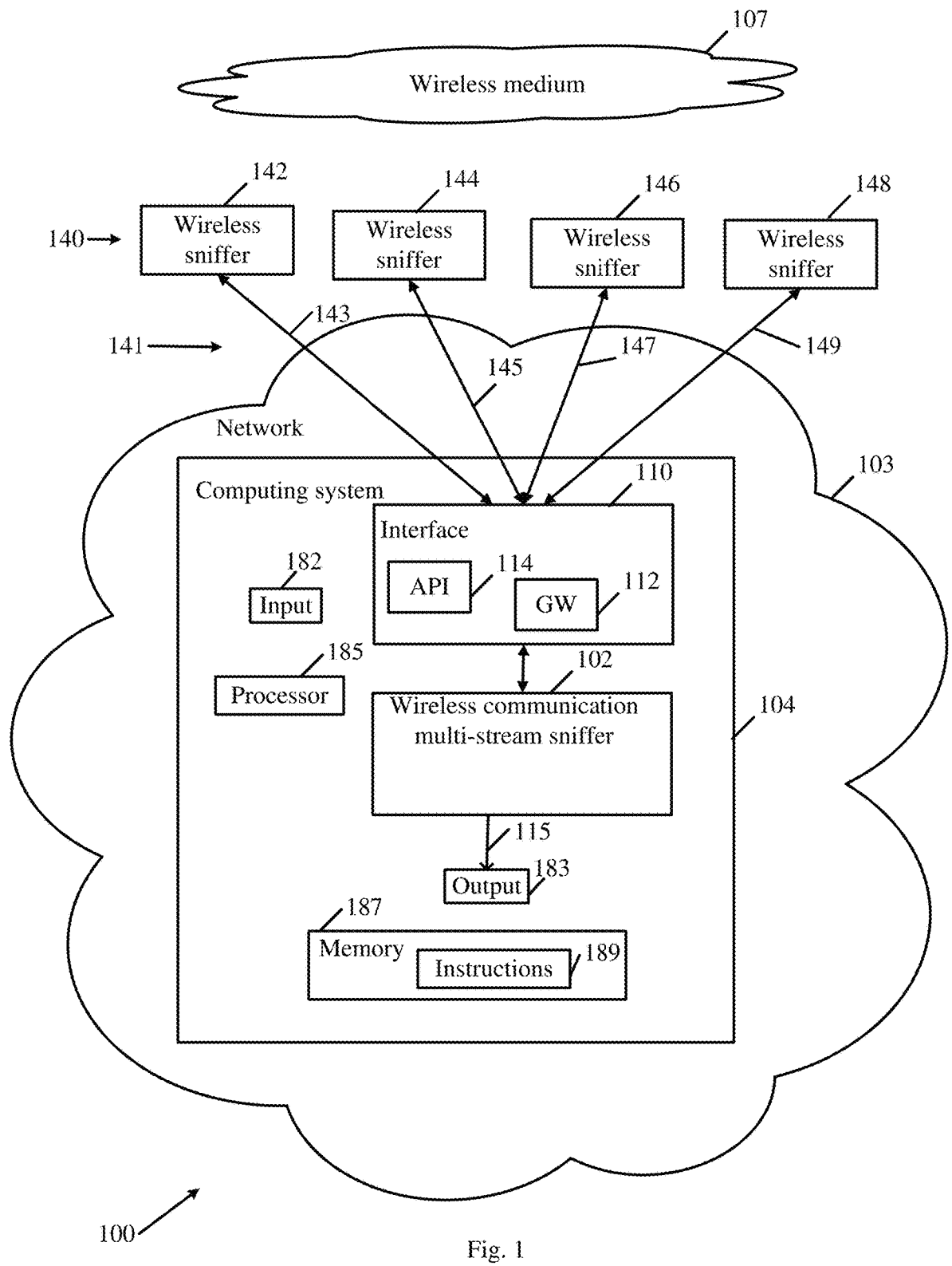
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a FLASH memory, a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part* 11*: Wireless LAN Medium Access Control* (*MAC*) *and Physical Layer* (*PHY*) *Specifications*, Dec. 7, 2016); IEEE 802.11ax (IEEE 802.11ax—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN); devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

In some demonstrative embodiments, system 100 may include a computing system 104, e.g., as described below.

In some embodiments, computing system 104 may include a local computer, a remote computer, a desktop, a mobile computer, server, a distributed computing system, and/or the like. In other embodiments, computing system 104 may include any other suitable computing arrangement and/or scheme.

In some demonstrative embodiments, a WLAN protocol, e.g., in accordance with *IEEE*802.11*ax Specification* (also referred to as "High Efficiency (HE) WLAN), may be configured to support dense Wi-Fi environments, for example, in which one or more APs may be configured to communicate, e.g., concurrently, with a plurality of STAs, e.g., associated STAs with the AP, using a PHY Protocol Data Unit (PPDU), e.g., an Uplink (UL) PPDU and/or a Downlink (DL) PPDU, for example, using MU MIMO, OFDMA multiple access schemes or any other RF techniques.

In some demonstrative embodiments, a STA may include a logical entity that is a singly addressable instance of a medium access control (MAC) and physical layer (PHY) interface to a wireless medium (WM). The STA may perform any other additional or alternative functionality.

In some demonstrative embodiments, an Access point (AP) may include an entity that contains a station (STA), e.g., one STA, and provides access to distribution services, via the WM, for associated STAs. The AP may perform any other additional or alternative functionality.

In some demonstrative embodiments, a STA may be configured to operate as a wireless sniffer, for example, to decode protocol messages, and to present the messages to an end-user in an easy-to-read manner, for example, to validate a correctness of a wireless protocol.

In some demonstrative embodiments, a wireless sniffer, which may utilize hardware of a STA, e.g., a wireless Network Interface Card (NIC), may be able to receive and decode signals and/or messages transmitted to, or transmitted from, a specific STA in a wireless network.

In some demonstrative embodiments, in some use cases and/or scenarios there may be a need to implement a wireless communication multi-stream sniffer, which may be able to receive and decode multiple of wireless streams, which may be included in a single transmission, for example, as a result of multi-station scenarios, e.g., in accordance with *IEEE*802.11*ax Specification*.

In one example, using a NIC of an AP as a sniffer ("AP sniffer") may not be suitable to support multi-stream sniffing.

In some demonstrative embodiments, computing system 104 may be configured to implement a wireless communication multi-stream sniffer 102, which may be configured to use two or more wireless communication sniffers, e.g., single-stream NICs, running in parallel.

In one example, computing system 104 may be configured to implement wireless communication multi-stream sniffer 102 as a "multi-stream 11ax sniffer", which may be configured to use two or more single-stream 11ax NICs, e.g., running in parallel.

In some demonstrative embodiments, wireless communication multi-stream sniffer 102 may be configured to provide a unified and synchronized multi-stream output showing a complete over-the-air traffic in real time, e.g., as described below.

In some demonstrative embodiments, wireless communication multi-stream sniffer 102 may be associated with and/or implemented as part of computing system 104.

In one example, wireless communication multi-stream sniffer 102 may be implemented, for example, as middleware, as part of any suitable application, and/or as part of a server.

In some demonstrative embodiments, wireless communication multi-stream sniffer 102 may be implemented using any suitable hardware components and/or software components, for example, processors, controllers, memory units, storage units, input units, output units, communication units, operating systems, and/or applications.

In some demonstrative embodiments, wireless communication multi-stream sniffer 102 may include, or may be part of a local application, a software, a computer program, or the like.

In some demonstrative embodiments, wireless communication multi-stream sniffer 102 may include, or may be part of a Web-based application, a web-site, a web-page, a stand-alone application, a plug-in, an ActiveX control, a rich content component (e.g., a Flash or Shockwave component), a cloud application and/or service, or the like.

In some demonstrative embodiments, wireless communication multi-stream sniffer 102 may include a local or remote application executed by computing system 104.

In some demonstrative embodiments, computing system 104 may include a memory 187 having stored thereon instructions 189.

In some demonstrative embodiments, computing system 104 may include a processor 185 to execute instructions 189, which may result in wireless communication multi-stream sniffer 102.

In some demonstrative embodiments, computing system 104 may optionally include any other suitable hardware components and/or software components.

In some demonstrative embodiments, some or all of the components of one or more of computing system 104 may be enclosed in a common housing or packaging, and may be interconnected or operably associated using one or more wired or wireless links. In other embodiments, components of one or more of computing system 104 may be distributed among multiple or separate devices.

In some demonstrative embodiments, processor 185 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 185 may execute instructions 189 resulting in wireless communication multi-stream sniffer 102, instructions of an Operating System (OS) of computing system 104 and/or of one or more suitable applications.

In some demonstrative embodiments, memory 187 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. In one example, memory 187 may store instructions 189 to be processed by processor 185.

In some demonstrative embodiments, computing system 104 may also include an input 182 and/or an output 183.

In some demonstrative embodiments, input 182 may include, for example, a keyboard, a keypad, a mouse, a touch-screen, a touch-pad, a track-ball, a stylus, a microphone, or other suitable pointing device or input device.

In some demonstrative embodiments, output 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices. In one example, output unit 183 may be configured to output and display the unified and synchronized multi-stream output, which shows the complete over-the-air traffic in real time.

In some demonstrative embodiments, computing system 104 may include a network interface 110 to communicate via a communication network 103.

In some demonstrative embodiments, communication network 103 may include a wired network, a wireless communication network, or any other combination of wireless/wired network.

In some demonstrative embodiments, communication network 103 may include, for example, a radio channel, a cellular channel, an RF channel, a WiFi channel, an IR channel, a Bluetooth (BT) channel, and or any other wireless network.

In some demonstrative embodiments, communication network 103 may include, for example, a Local Are Network (LAN), a Peripheral Component Interconnect (PCI) Express access network, and/or any other wired network.

In some demonstrative embodiments, wireless communication multi-stream sniffer 102 may be configured to configure, via the communication network 103, a plurality of wireless communication sniffers 140 to sniff a respective plurality of wireless streams, for example, over a wireless medium 107, e.g., as described below.

In some demonstrative embodiments, wireless communication multi-stream sniffer 102 may be configured to communicate with one or more of the wireless communication sniffers 140 via the communication network 103, e.g., as described below.

In some demonstrative embodiments, network interface 110 may be configured to communicate with the plurality of wireless communication sniffers 140, e.g., as described below.

In some demonstrative embodiments, network interface 110 may be associated with and/or may include, for example, a gateway (GW) 112 and/or an application programming interface (API) 114, for example, to transfer information from wireless communication sniffers 140 to one or more other, e.g., internal or external, parties, users, applications and/or systems.

In some demonstrative embodiments, GW 112 may be configured to communicate with wireless communication sniffers 140, for example, via a wired connection, via a wireless connection, via an Internet gateway, and/or the like.

In some demonstrative embodiments, API 114 may include any suitable API and/or any other suitable interface, e.g., to enable wireless communication sniffers 140 to interact with computing system 104 and/or with wireless communication multi-stream sniffer 102.

In some demonstrative embodiments, network interface 110 may be part of computing system 104. In other embodiments, one or more elements of network interface 110, e.g., GW 112, API 114, and/or any other component or element of network interface 110 may be part of and/or distributed between any other elements of system 100 and/or any other computing systems.

In some demonstrative embodiments, one or more of wireless communication sniffers 140 may be implemented as separate and/or stand-alone elements, e.g., separate from computing system 104.

In some demonstrative embodiments, one or more of wireless communication sniffers 140 may be implemented as part of computing system 104.

In some demonstrative embodiments, wireless communication multi-stream sniffer 102 may be configured to configure, e.g., via the communication network 103, the plurality of wireless communication sniffers 140 to sniff a respective plurality of wireless streams, for example, over wireless medium 107, e.g., as described below.

In some demonstrative embodiments, for example, wireless communication sniffers 140 may include, for example, a first wireless communication sniffer 142, and one or more second wireless communication sniffers, for example, including a second wireless communication sniffer 144, a third wireless communication sniffer 146, and/or a fourth wireless communication sniffer 148.

In other embodiments, wireless communication sniffers 140 may include any other number of sniffers, e.g., two or more wireless communication sniffers.

In some demonstrative embodiments, the plurality of wireless communication sniffers 140 may be configured to sniff the plurality of wireless streams over the wireless medium 107, e.g., as descried below.

In some demonstrative embodiments, wireless communication sniffers 140 may include a plurality of Wireless Network Interface Cards (WNICs), e.g., as described below. In other embodiments, wireless communication sniffers 140 may include and/or may be implemented using any other sniffer circuitry and/or logic.

In one example, a WNIC may include at least one radio including one or more wireless receivers (Rx) including circuitry and/or logic to receive wireless communication signals, RF signals, frames, blocks, transmission streams, packets, messages, data items, and/or data; and/or one or more wireless transmitters (Tx) including circuitry and/or logic to transmit wireless communication signals, RF signals, frames, blocks, transmission streams, packets, messages, data items, and/or data. For example, a NIC may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, two or more of the plurality of wireless communication sniffers 140 may be included in a single device.

In some demonstrative embodiments, two or more of the plurality of wireless communication sniffers 140 may be distributed among a plurality of separated devices.

In some demonstrative embodiments, wireless communication multi-stream sniffer 102 may be configured to configure the plurality of wireless communication sniffers 140, for example, by configuring the plurality of wireless communication sniffers 140 according to a respective plurality of stream configurations, e.g., as described below.

In some demonstrative embodiments, wireless communication multi-stream sniffer 102 may be configured to process a plurality of sniffer streams 141 received from the plurality of wireless communication sniffers 140 via the communication network 103, e.g., as described below.

In some demonstrative embodiments, a sniffer stream from a wireless communication sniffer from the plurality of wireless communication sniffers 140, may include frame information of frames captured by the wireless communication sniffer according to a stream configuration of the wireless communication sniffer, e.g., as described below.

In one example, a sniffer stream may refer to a capture of a wireless communication sniffer, e.g., a live capture or any other capture.

In one example, a first sniffer stream 143 from wireless communication sniffer 142 may include first frame information of first frames captured by wireless communication sniffer 142 according to a first stream configuration of wireless communication sniffer 142; a second sniffer stream 145 from wireless communication sniffer 144 may include second frame information of second frames captured by wireless communication sniffer 144 according to a second stream configuration of wireless communication sniffer 144; a third sniffer stream 147 from wireless communication sniffer 146 may include third frame information of third frames captured by wireless communication sniffer 146 according to a third stream configuration of wireless communication sniffer 142; and/or a fourth sniffer stream 149 from wireless communication sniffer 148 may include fourth frame information of fourth frames captured by wireless communication sniffer 148 according to a fourth stream configuration of wireless communication sniffer 148, e.g., as described below.

In some demonstrative embodiments, wireless communication multi-stream sniffer 102 may be configured to generate a unified sniffer stream 115, for example, by combining the plurality of sniffer streams 141, for example, based on the plurality of stream configurations, e.g., as described below.

In one example, unified sniffer stream 115 may include an aggregated output from wireless communication multi-stream sniffer 102, which may aggregate outputs of the plurality of wireless communication sniffers 140, and may synchronize the outputs into a single ordered output stream, e.g., as described below.

Some embodiments are described herein with respect to a multi-stream sniffer, e.g., multi-stream sniffer 102, configured to control and/or configured a plurality of sniffers including a plurality of wireless communication sniffers, e.g., wireless communication sniffers. However, in other embodiments, the multi-stream sniffer may configure and/or control a plurality of sniffers, for example, including one or more wired sniffers to sniff communications over one or more wired communication links and/or channels, for example, in addition to or instead of the wireless communication sniffers. According to these embodiments, the multi-stream sniffer may be configured to generate a multi-stream output, e.g., the unified sniffer stream 115, including one or more wired streams sniffed buy the one or more wired communication sniffers.

In some demonstrative embodiments, wireless communication multi-stream sniffer 102 may be configured to synchronize the plurality of sniffer streams 141 to a reference time-base, e.g., as described below.

In some demonstrative embodiments, wireless communication multi-stream sniffer 102 may be configured to determine a time-base, for example, based on a first stream of the plurality of sniffer streams 141, e.g., as described below.

For example, wireless communication multi-stream sniffer 102 may determine the time-base, for example, based on first stream 143, e.g., as described below.

In some demonstrative embodiments, wireless communication multi-stream sniffer 102 may be configured to determine for one or more second streams of the plurality of sniffer streams 141 one or more respective time correction factors relative to the time-base, e.g., as described below.

For example, wireless communication multi-stream sniffer 102 may determine for streams 145, 147 and/or 149 one or more respective time correction factors relative to the time-base, for example, of first stream 143, e.g., as described below.

In some demonstrative embodiments, wireless communication multi-stream sniffer 102 may be configured to combine the plurality of sniffer streams 141 into the unified sniffer stream 115, for example, based on the one or more time correction factors, e.g., as described below.

In some demonstrative embodiments, wireless communication multi-stream sniffer 102 may be configured to use one or more common frames that all STAs may be able to hear, for example, to automatically fix timestamps of frames that follow the common frames, e.g., as described below.

In some demonstrative embodiments, the common frames may include beacon frames from an AP, for example, in HE-MU scenarios, e.g., as described below.

In other embodiments, the common frame may include any other frames, which may appear in several streams. For example, in a case of multi-protocol sniffing, e.g., sniffing of two or more protocols, for example, a Wi-Fi protocol, a BT protocol and/or any other protocol, a common frame may be defined and may be actively generated, for example, to appear periodically in all the protocols being sniffed, thus synchronizing and unifying all frames sniffed over the air (OTA), e.g., sniffed Wi-Fi frames, BT frames and/or any other protocol frames.

In some demonstrative embodiments, wireless communication multi-stream sniffer 102 may be configured to constantly correct a time drift on every sniffer, and/or to maintain synchronization on all sniffers. For example, every time a certain wireless sniffer captures a beacon with a sequence number already seen, the time difference between them may be applied to the following frames in that stream, e.g., as described below.

In some demonstrative embodiments, wireless communication multi-stream sniffer 102 may be configured to identify a common frame, which may be included in the first stream and in a second stream of the one or more second streams, and to determine a time correction factor for the second stream, for example, based on a difference between a first timestamp of the common frame in the first stream and a second timestamp of the common frame in the second stream, e.g., as described below.

In some demonstrative embodiments, the common frame may include a beacon frame.

In other embodiments, the common frame may include any other type of frame.

For example, wireless communication multi-stream sniffer 102 may identify a common beacon frame, which is included in the stream 143 and in stream 145, and may determine a time correction factor for stream 145, for example, based on a difference between a first timestamp of the common beacon frame in stream 143 and a second timestamp of the common beacon frame in stream 145, e.g., as described below.

In some demonstrative embodiments, wireless communication multi-stream sniffer 102 may be configured to determine an order of frames of the plurality of sniffer streams 141 in the unified sniffer stream 115, e.g., as described below.

In some demonstrative embodiments, wireless communication multi-stream sniffer 102 may be configured to determine an adjusted timestamp of a frame of the second sniffer stream, for example, based on the time correction factor, e.g., as described below.

In some demonstrative embodiments, wireless communication multi-stream sniffer 102 may be configured to insert the frame of the second sniffer stream into the unified sniffer stream 115 at a location, which may be, for example, based on the adjusted timestamp of the frame, e.g., as described below.

For example, wireless communication multi-stream sniffer 102 may determine an adjusted timestamp of a frame of the sniffer stream 145, for example, based on the time correction factor for sniffer stream 145, and may insert the frame of the sniffer stream 145 into the unified sniffer stream 115 at a location, which may be based, for example, on the adjusted timestamp of the frame of the sniffer stream 145, e.g., as descried below.

In some demonstrative embodiments, wireless communication multi-stream sniffer 102 may be configured to identify duplicate frames, which may appear in the plurality of sniffer streams 141, and to discard them from the unified sniffer stream 115, e.g., as described below.

In some demonstrative embodiments, wireless communication multi-stream sniffer 102 may be configured to identify in a first sniffer stream of the plurality of sniffer streams 141 a duplicate frame which is a duplicate of a frame from a second sniffer stream of the plurality of sniffer streams 141, e.g., as described below.

In some demonstrative embodiments, wireless communication multi-stream sniffer 102 may be configured to discard the duplicate frame, e.g., as described below.

For example, wireless communication multi-stream sniffer 102 may identify in sniffer stream 145 a duplicate frame which is a duplicate of a frame from sniffer stream 143, and may discard the duplicate frame in sniffer stream 145, e.g., as described below.

In some demonstrative embodiments, wireless communication multi-stream sniffer 102 may be configured to update one or more of the time correction factors, e.g., as described below.

In some demonstrative embodiments, wireless communication multi-stream sniffer 102 may be configured to identify a subsequent common frame, which is included in the first stream and in the second stream, e.g., as described below.

In some demonstrative embodiments, wireless communication multi-stream sniffer 102 may be configured to update the time correction factor for the second stream, for example, based on a difference between a first timestamp of the subsequent common frame in the first stream and a second timestamp of the subsequent common frame in the second stream, e.g., as described below.

In some demonstrative embodiments, the subsequent common frame may include a subsequent common beacon frame.

In other embodiments, the subsequent common frame may include any other type of frame.

For example, wireless communication multi-stream sniffer 102 may identify a subsequent beacon frame, which is included in the stream 143 and in stream 145, and may determine an updated time correction factor for stream 145, for example, based on a difference between a first timestamp of the subsequent common beacon frame in stream 143 and a second timestamp of the subsequent common beacon frame in stream 145, e.g., as described below.

In some demonstrative embodiments, wireless communication multi-stream sniffer 102 may be configured to configure the plurality of wireless communication sniffers 140, for example, based on one or more attributes of frames to be sniffed, e.g., as described below.

In some demonstrative embodiments, wireless communication multi-stream sniffer 102 may be configured to configure a wireless communication sniffer from the plurality of wireless communication sniffers 140, for example, according to a stream configuration, for example, by providing to the wireless communication sniffer one or more attributes of frames to be captured by the wireless communication sniffer, e.g., as described below.

In some demonstrative embodiments, the one or more attributes may include an identifier of a STA to receive the frames, e.g., as described below.

In some demonstrative embodiments, the one or more attributes may include an Association Identifier (ID) (AID) of the STA, e.g., as described below.

In some demonstrative embodiments, the one or more attributes may include one or more parameters of a wireless communication channel over which the frames are to be captured, e.g., as described below.

In some demonstrative embodiments, the one or more attributes may include one or more parameters of a wireless frequency band over which the frames are to be captured, e.g., as described below.

In some demonstrative embodiments, the one or more attributes may include one or more parameters of a wireless communication protocol of the frames to be captured, e.g., as described below.

In some demonstrative embodiments, the one or more attributes may include one or more parameters of a wireless network of the frames to be captured.

In other embodiments, any other additional or alternative attributes may be used.

In some demonstrative embodiments, wireless communication multi-stream sniffer 102 may be configured to configure a first wireless communication sniffer of the plurality of wireless communication sniffers 140 to sniff a first user stream of a multi-user (MU) transmission, to configure a second wireless communication sniffer of the plurality of wireless communication sniffers 140 to sniff a second user stream of the MU transmission, and to generate the unified sniffer stream 115 including the first user stream and the second user stream, e.g., as described below.

For example, wireless communication multi-stream sniffer 102 may configure wireless communication sniffer 142 to sniff a first user stream of a MU transmission, for example, by providing to wireless communication sniffer 142 a first AID of a first STA to receive the first user stream; and/or may configure wireless communication sniffer 144 to sniff a second user stream of the MU transmission, for example, by providing to wireless communication sniffer 144 a second AID of a second STA to receive the second user stream, e.g., as described below.

In some demonstrative embodiments, wireless communication multi-stream sniffer 102 may be configured to configure a first wireless communication sniffer of the plurality of wireless communication sniffers 140 to capture one or more first frames over a first wireless communication channel, to configure a second wireless communication sniffer of the plurality of wireless communication sniffers 140 to capture one or more second frames over a second wireless communication channel different from the first wireless communication channel, and to generate the unified sniffer stream 115 including the one or more first frames captured over the first wireless communication channel and the one or more second frames captured over the second wireless communication channel, e.g., as described below.

For example, wireless communication multi-stream sniffer 102 may configure wireless communication sniffer 142 to sniff the one or more first frames over the first wireless communication channel, for example, by providing to wireless communication sniffer 142 one or more first parameters of the first wireless communication channel; and/or may configure wireless communication sniffer 144 to sniff the one or more second frames, for example, by providing to wireless communication sniffer 144 one or more second parameters of the second wireless communication channel, e.g., as described below.

In some demonstrative embodiments, wireless communication multi-stream sniffer 102 may be configured to configure a first wireless communication sniffer of the plurality of wireless communication sniffers 140 to capture one or more first frames over a first wireless frequency band, to configure a second wireless communication sniffer of the plurality of wireless communication sniffers 140 to capture one or more second frames over a second wireless frequency band different from the first wireless frequency band, and to generate the unified sniffer stream 115 including the one or more first frames captured over the first wireless frequency band and the one or more second frames captured over the second wireless frequency band, e.g., as described below.

For example, wireless communication multi-stream sniffer 102 may configure wireless communication sniffer 142 to sniff the one or more first frames over the first wireless frequency band, for example, by providing to wireless communication sniffer 142 one or more first parameters of the first wireless frequency band; and/or may configure wireless communication sniffer 144 to sniff the one or more second frames, for example, by providing to wireless communication sniffer 144 one or more second parameters of the second wireless frequency band, e.g., as described below.

In some demonstrative embodiments, wireless communication multi-stream sniffer 102 may be configured to configure a first wireless communication sniffer of the plurality of wireless communication sniffers 140 to capture one or more first frames of a first wireless communication protocol, to configure a second wireless communication sniffer of the plurality of wireless communication sniffers 140 to capture one or more second frames of a second wireless communication protocol different from the first wireless communication protocol, and to generate the unified sniffer stream 115 including the one or more first frames of the first wireless communication protocol and the one or more second frames of the second wireless communication protocol, e.g., as described below.

For example, wireless communication multi-stream sniffer 102 may configure wireless communication sniffer 142 to sniff the one or more first frames of the first wireless communication protocol, for example, by providing to wireless communication sniffer 142 one or more first parameters of the first wireless communication protocol; and/or may configure wireless communication sniffer 144 to sniff the one or more second frames, for example, by providing to wireless communication sniffer 144 one or more second parameters of the second wireless communication protocol, e.g., as described below.

In some demonstrative embodiments, wireless communication multi-stream sniffer 102 may be configured to configure a first wireless communication sniffer of the plurality of wireless communication sniffers 140 to capture one or more first frames of a first wireless network, to configure a second wireless communication sniffer of the plurality of wireless communication sniffers 140 to capture one or more second frames of a second wireless network different from the first wireless network, and to generate the unified sniffer stream 115 including the one or more first frames of the first wireless network and the one or more second frames of the second wireless network, e.g., as described below.

For example, wireless communication multi-stream sniffer 102 may configure wireless communication sniffer 142 to sniff the one or more first frames of the first wireless network, for example, by providing to wireless communication sniffer 142 one or more first parameters of the first wireless network; and/or may configure wireless communication sniffer 144 to sniff the one or more second frames, for example, by providing to wireless communication sniffer 144 one or more second parameters of the second wireless network, e.g., as described below.

Figure 2:
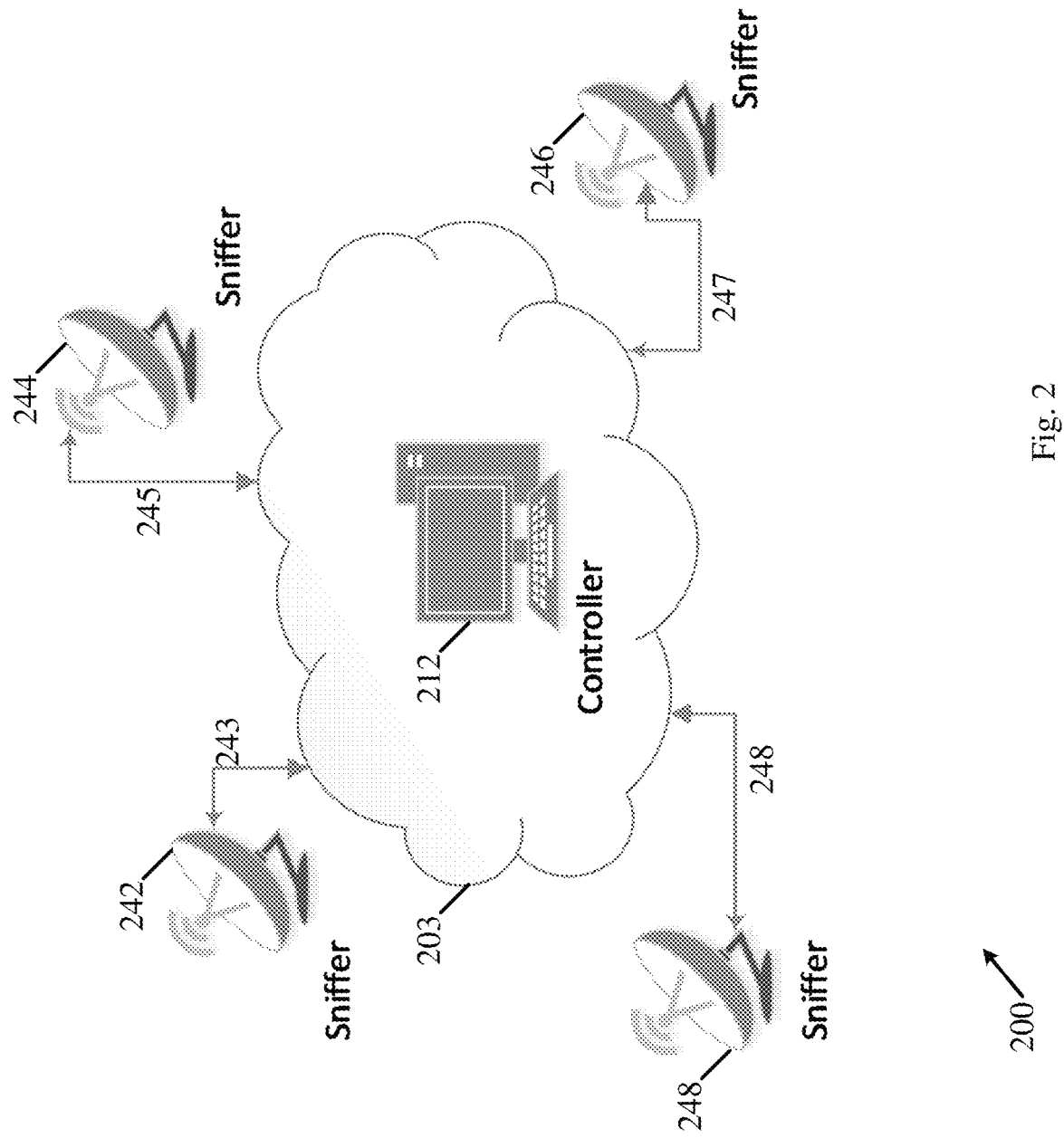
FIG. 2 is a schematic illustration of a system, in accordance with some demonstrative embodiments.

Reference is made to FIG. 2, which schematically illustrates a system 200, in accordance with some demonstrative embodiments.

In some demonstrative embodiments, as shown in FIG. 2, system 200 may include a plurality of wireless communication sniffers to output a respective plurality of sniffer streams, e.g., as describe below.

In some demonstrative embodiments, as shown in FIG. 2, the plurality of wireless communication sniffers may include a first wireless communication sniffer 242, a second wireless communication sniffer 244, a third wireless communication sniffer 246, and/or a fourth wireless communication sniffer 248. For example, wireless communication sniffer 142 (FIG. 1) may include, operate as, and/or perform the functionality of wireless communication sniffer 242; wireless communication sniffer 144 (FIG. 1) may include, operate as, and/or perform the functionality of wireless communication sniffer 244; wireless communication sniffer 146 (FIG. 1) may include, operate as, and/or perform the functionality of wireless communication sniffer 246; and/or wireless communication sniffer 148 (FIG. 1) may include, operate as, and/or perform the functionality of wireless communication sniffer 248.

In some demonstrative embodiments, as shown in FIG. 2, system 200 may include a controller 212. For example, wireless communication multi-stream sniffer 102 (FIG. 1) may include, operate as, and/or perform the functionality of controller 212.

In one example, controller 212 may include or may be implemented by a device, component, a program and/or machine that synchronizes the plurality of sniffer streams and to create a unified sniffer stream, e.g., a single unified output stream.

In some demonstrative embodiments, as shown in FIG. 2, controller 212 may configure wireless communication sniffer 242 to output a first sniffer stream 243; controller 212 may configure wireless communication sniffer 244 to output a second sniffer stream 245; controller 212 may configure wireless communication sniffer 246 to output a third sniffer stream 247; and/or controller 212 may configure wireless communication sniffer 248 to output a fourth sniffer stream 248.

In some demonstrative embodiments, as shown in FIG. 2, controller 212 may communicate with one or more of the plurality of wireless communication sniffers via a communication network 203.

In some demonstrative embodiments, as shown in FIG. 2, controller 212 may be implemented by a separate component from the plurality of wireless communication sniffers.

In other embodiments, controller 212 may be implemented as part of a wireless communication sniffer of the plurality of wireless communication sniffers.

In other embodiments, controller 212 may be distributed between two or more sniffers of the plurality of wireless communication sniffers.

In some demonstrative embodiments, controller 212 may have access to the plurality of wireless communication sniffers. For example, the access may be over a LAN network, a Wi-Fi network, a PCI-e mechanism, a wired network, and/or any other network and/or access technology.

In one example, the plurality of wireless communication sniffers does not have to be connected to each other, but may be reachable from the controller 212.

In some demonstrative embodiments, the plurality of wireless communication sniffers may not have to be on different physical machines. For example, two or more wireless sniffers (NICs) may be on a single computer, server and the like, and a wireless NIC may act as an independent wireless communication sniffer, which may be connected to the controller 212, for example, via the Wi-Fi network, the PCI-e connection or the like.

In some demonstrative embodiments, controller 212 may configure the plurality of sniffers, for example, to sniff user streams of a MU transmission, e.g., as described below.

In other embodiments, controller 212 may configure the plurality of sniffers, for example, to sniff frames according to any other additional or alternative attributes, e.g., as described below.

In some demonstrative embodiments, controller 212 may configure the plurality of sniffers, for example, with one or more AP parameters, which may be advertised by an AP.

In one example, controller 212 may configure one or more of the plurality of sniffers by scanning for an AP with a user-configurable Service Set Identifier (SSID), extracting one or more AP parameters, e.g., a wireless channel, a frequency and the like, and configuring the sniffers accordingly, e.g., automatically.

In another example, controller 212 may configure the plurality of sniffers using any other method and/or mechanism.

In some demonstrative embodiments, a wireless sniffer, e.g., each wireless sniffer, may be configured to sniff frames that are intended for a specific, e.g., different, STA. For example, sniffer 242 may be configured to sniff HE MU frames intended for a STA with an Association ID 1, sniffer 244 may be configured to sniff HE MU frames intended for a STA with an Association ID 2, sniffer 246 may be configured to sniff HE MU frames intended for a STA with an Association ID 3, and/or sniffer 248 may be configured to sniff HE MU frames intended for a STA with an Association ID 4.

In one example, controller 212 may be configured to dynamically extract, e.g., during runtime, an AID of a STA, and to configure, e.g., during runtime, wireless communication sniffers, for example, including updates, for example, if a STA disconnects and/or reconnects with a different AID.

In another example, extraction of an AID of a STA and configuration of the wireless communication sniffers may be performed using any other method.

In some demonstrative embodiments, controller 212 may configure the wireless communication sniffer to sniff frames, which may be included in the unified sniffer stream, e.g., as described below.

In some demonstrative embodiments, controller 212 may be configured to synchronize between the sniffer streams, for example, to account for and/or support a sniffer stream having its own clock, configured time, time drift and the like.

In some demonstrative embodiments, controller 212 may synchronize between the sniffer streams according to a time-base of one of the plurality of sniffer streams. For example, all streams of the plurality of sniffer streams may be synced to a time-base of one of the streams, denoted "stream #0", e.g., a time-base of stream 243, for example, instead of a real time ("absolute time").

In some demonstrative embodiments, controller 212 may be configured to identify and utilize a common frame to sync the plurality of sniffer streams with the time-base of stream 243, e.g., as described below.

In one example, the common frame may include a beacon frame from an AP, e.g., for syncing of HE MU transmissions, e.g., as described below.

In another example, any other common frame, e.g., a periodic frame, may be used.

In some demonstrative embodiments, controller 212 may perform an initial synchronization algorithm to sync the plurality of sniffer streams with the time-base, e.g., using one or more of the following operations:
1) Sniff on all the plurality of sniffers for X time units, wherein X is a multiple of the beacon interval. For example, a value of X may be 20× beacon interval or any other value.
2) Temporarily keep aside only the beacons of the AP for these streams.
3) For each sniffer:
   3.1 While iterating from a newest beacon to an oldest in the capture, search for a beacon with a same sequence number that appears in the capture for stream #0.
   3.2 If one is found, a time-correcting factor for this stream may be a difference between the timestamp of the beacon in stream #0 and the timestamp in this stream.
   Note: an original timestamp of each frame may be given on the sniffer that caught it, and is not affected by factors such as LAN network latency and the like.
4) If there are streams that do not have a common beacon with stream #0, take another capture for them and for stream #0.
Note: it may not be required that the same beacon appears in all streams simultaneously. This is nice to have, but not a requirement for doing the initial synchronization.

In some demonstrative embodiments, controller 212 may perform some or all of the above operations and/or may utilize any other additional or alternative algorithm and/or method to sync the plurality of sniffer streams with the time-base.

Figure 3:
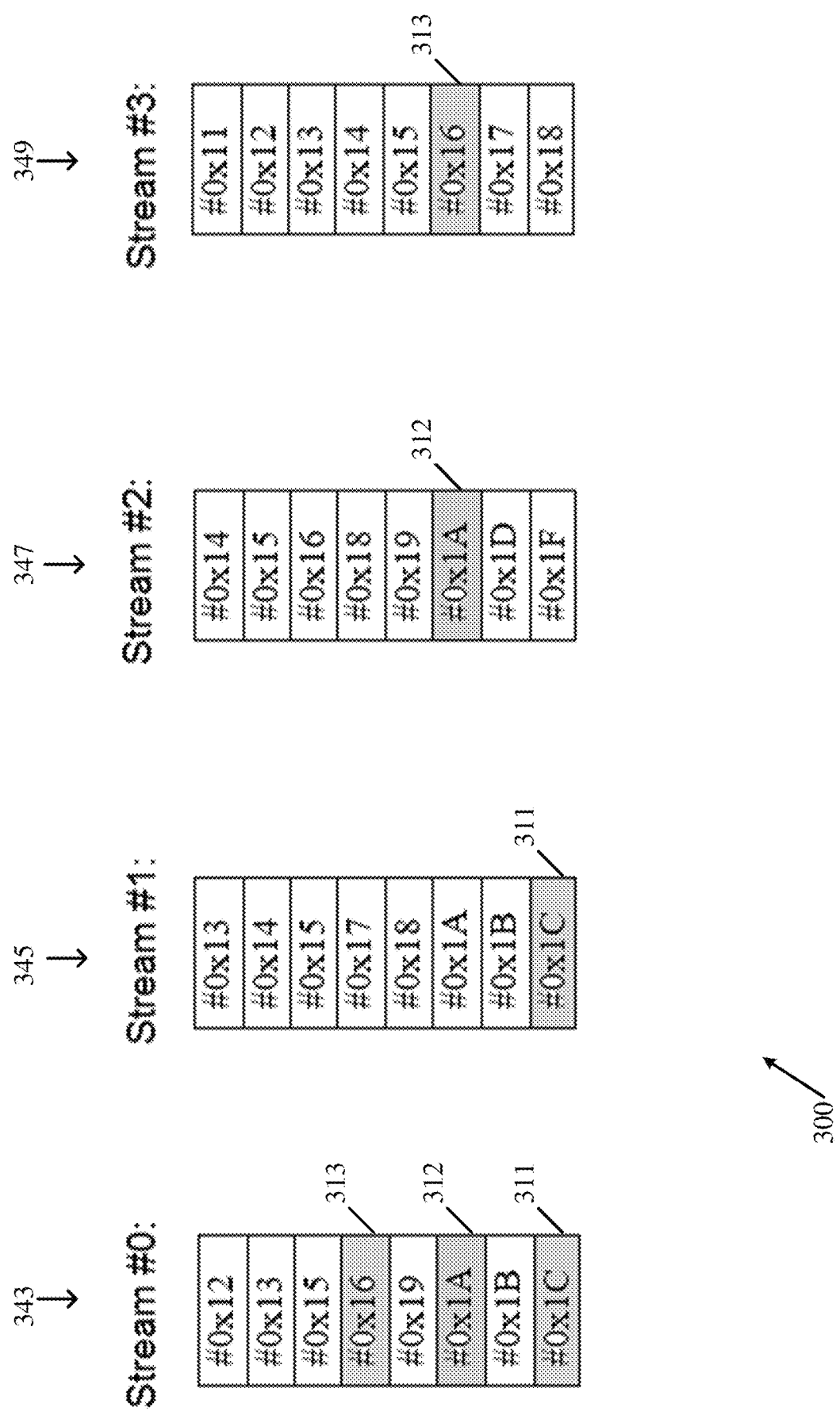
FIG. 3 is a schematic illustration of a plurality of sniffer streams, in accordance with some demonstrative embodiments.

Reference is made to FIG. 3, which schematically illustrates a plurality of sniffer streams 300, in accordance with some demonstrative embodiments.

In some demonstrative embodiments, the plurality of sniffer streams 300 may include a first sniffer stream 343, denoted "Stream #0", a second sniffer stream 345, denoted "Stream #1", a third sniffer stream 347, denoted "Stream #2", and/or a fourth sniffer stream 349, denoted "Stream #3".

In some demonstrative embodiments, wireless communication sniffer 242 (FIG. 2) may output sniffer stream 343; wireless communication sniffer 244 (FIG. 2) may output sniffer stream 345; wireless communication sniffer 246 (FIG. 2) may output sniffer stream 347; and/or wireless communication sniffer 248 (FIG. 2) may output sniffer stream 349.

In some demonstrative embodiments, as shown in FIG. 3, the plurality of sniffer streams 300 may include sequence numbers of beacons captured on each sniffer stream.

In some demonstrative embodiments, controller 212 (FIG. 2) may sync the plurality of sniffer streams 300 to a time-base of sniffer stream 343 (Stream #0).

In some demonstrative embodiments, controller 212 (FIG. 2) may use a first common beacon, denoted "#0x1C", which is common to streams 345 and 343, for example, to sync sniffer stream 345 ("Stream #1") to the time-base of sniffer stream 343 (Stream #0).

In some demonstrative embodiments, controller 212 (FIG. 2) may use a second common beacon 312, denoted "#0x1A", which is common to streams 347 and 343, for example, to sync sniffer stream 347 ("Stream #2") to the time-base of sniffer stream 343 (Stream #0).

In some demonstrative embodiments, controller 212 (FIG. 2) may use a third common beacon 313, denoted "#0x16", which is common to streams 349 and 343, for example, to sync sniffer stream 349 ("Stream #3") to the time-base of sniffer stream 343 (Stream #0).

In some demonstrative embodiments, controller 212 (FIG. 2) may determine a time correcting factor for a sniffer stream, e.g., for each sniffer stream, for example, after synchronizing (synching) a plurality of sniffer streams to a time-base of a sniffer stream. For example, controller 212 (FIG. 2) may determine a plurality of time correcting factors for the plurality of sniffer streams 300, for example, after synchronizing the plurality of sniffer streams 300 to the time-base of sniffer stream 343 (Stream #0).

In some demonstrative embodiments, controller 212 (FIG. 2) may output frames of the plurality of sniffer streams, for example, to a unified sniffer stream, for example, by taking advantage of frames in a sniffer stream being ordered within the stream, e.g., according to one or more of the following operations:

1) Read a first frame from each stream #0, . . . , # n−1 into curr_frame[0 . . . n−1]0.2) Add a relevant time-correcting factor to each of the curr_frame[0 . . . n−1] frames.3) Do in a loop until the multi-sniffer is stopped:
   a) Find the stream x in which curr_frame[x] has the oldest timestamp.
   b) Output curr_frame[x] to the unified stream.
   c) Read next frame from stream X into curr_frame[x].
      (i) If this frame was already seen, discard it as a duplicate.
   d) If any of the other frames in curr_frame[x] were outputted (including just now), disregard them as well and read the next frame from their streams.

In other embodiments, controller 212 (FIG. 2) may perform some or all of the above operations and/or may use any other algorithm and/or method, for example, to output frames of the plurality of sniffer streams to the unified sniffer stream.

In some demonstrative embodiments, controller 212 (FIG. 2) may be configured to continue syncing the sniffer streams, e.g., throughout the lifetime of a an output of wireless multi-sniffer Since, for example, since a time-correcting factor may change over time, e.g., due to time drifts and the like.

In some demonstrative embodiments, controller 212 (FIG. 2) may continue to sync the sniffer streams, for example, according to one or more operations of a synchronizing algorithm, e.g., as follows:

The last beacons seen on a stream X, denoted "beacons_X" may be saved in a cyclic buffer. Then, when a beacon is read on a stream Y:
1) If Y is not stream #0, and this sequence number was previously seen on stream #0, we can update the time-correcting factor in the same way as we did for the initial value.
2) If Y is stream #0:
   a) Look at all beacons_X cyclic buffers for the other streams and see if the beacon was seen in any of them.
   b) If it was—update the time-correcting factor for all those other streams that have this beacon accordingly.

In some demonstrative embodiments, the synchronizing algorithm may use any frame, e.g., a beacon frame or any other frame, which may be expected to appear in two or more sniffer streams.

In other embodiments, controller 212 (FIG. 2) may use any other algorithm and/or method, for example, to continuously synchronize the sniffer streams.

Figure 4:
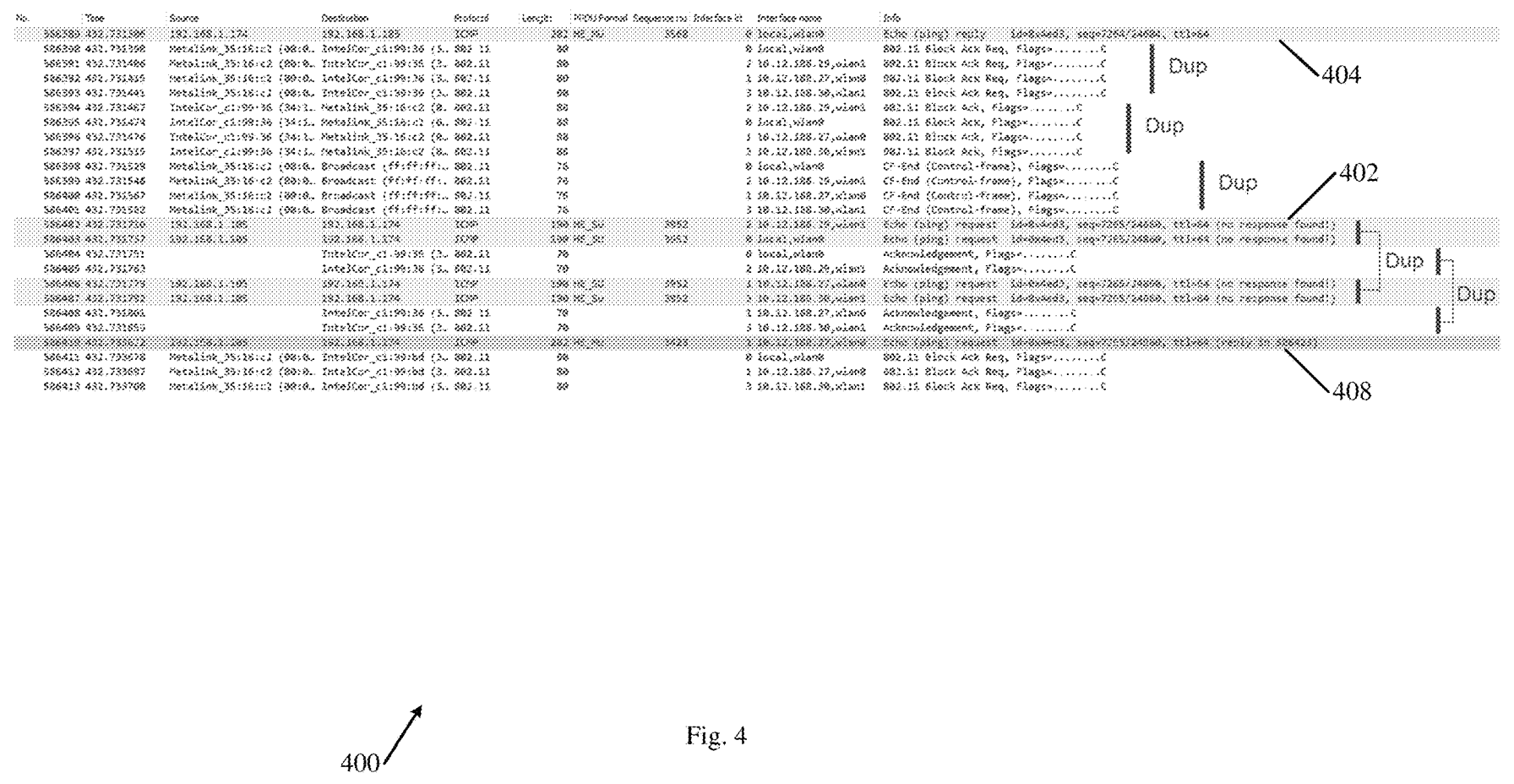

Reference is made to FIG. 4, which schematically illustrates a snapshot of a unified sniffer stream, in accordance with some demonstrative embodiments.

In some demonstrative embodiments, the unified sniffer stream may combine four sniffer streams from four respective wireless communication sniffers, e.g., as described below.

In some demonstrative embodiments, the four wireless communication sniffers may include a first wireless communication sniffer having a first interface ID "0", a second wireless communication sniffer having a second interface ID "1", a third wireless communication sniffer having a third interface ID "2", and/or a fourth wireless communication sniffer having a fourth interface ID "3".

In some demonstrative embodiments, as shown in FIG. 4, a frame 402, e.g., a ping request frame, having a sequence number of 3952 may be captured by the four wireless communication sniffers.

In some demonstrative embodiments, as shown in FIG. 4, frame 402 may first be captured by wireless communication sniffer with interface ID "2", and then by the other three wireless sniffers.

In some demonstrative embodiments, controller 212 (FIG. 2) may be configured to discard the three duplicates of frame 402.

In some demonstrative embodiments, as shown in FIG. 4, a max time difference of frame 402 between the four sniffers may be less than 90 microseconds.

In some demonstrative embodiments, one or more other frames may have a larger time difference, but still very low. In one example, an existence of this time difference may emphasizes an advantage of continuously updating the time-correcting factor, e.g., throughout the run.

In some demonstrative embodiments, the unified sniffer stream may include user streams of a MU transmission, e.g., as described below.

In some demonstrative embodiments, as shown in FIG. 4, the unified sniffer stream may include a user stream 404 of a MU transmission. The user stream 404 may have a sequence number of 3560.

In some demonstrative embodiments, as shown in FIG. 4, user stream 404 may be sent from a STA having an IP address of 192.168.1.174 to an AP having an IP address of 192.168.1.105, for example, as indicated by the Transmitter Address (TA) and Receiver Address (RA) MAC addresses of the frame.

In some demonstrative embodiments, as shown in FIG. 4, user stream 404 may be captured by the first wireless sniffer having the interface ID "0", which may be configured to capture frames that are intended to the AP having the IP address of 192.168.1.105.

In some demonstrative embodiments, as shown in FIG. 4, user stream 404 may appear only once in the unified sniffer stream, for example, if only one wireless sniffer, e.g. the first wireless sniffer having the interface ID "0", is configured to capture frames intended for the AP.

In some demonstrative embodiments, as shown in FIG. 4, the unified sniffer stream may include a user stream 408 of the MU transmission. The user stream 408 may have a sequence number of 3423.

In some demonstrative embodiments, as shown in FIG. 4, user stream 408 may be sent from the AP having the IP address of 192.168.1.105 to the STA having the IP address of 192.168.1.174.

In some demonstrative embodiments, as shown in FIG. 4, user stream 408 may be captured by the second wireless sniffer having the interface ID "1", which may be configured to capture frames that are intended for the STA having the IP address of 192.168.1.174.

In some demonstrative embodiments, as shown in FIG. 4, user stream 408 may appear only once in the unified sniffer stream, for example, if only one wireless sniffer, e.g. the second wireless sniffer having the interface ID "1", is configured to capture frames for the STA.

In some demonstrative embodiments, the unified sniffer stream may show user streams of a MU transmission that are intended for different users, e.g., as described below.

In some demonstrative embodiments, a multi-stream sniffer, e.g., multi-stream sniffer 102 (FIG. 1), may not be required to rely on any properties and/or technology, e.g., HE-MU technology, Wi-FI technology, and the like, for example, except for being able to use a common frame for the initial synchronizing and/or the re-synchronizing algorithms.

In some demonstrative embodiments, the common frame may be used, for example, to enable to combine sniffer streams of different domains, e.g., as described below.

In one example, if a common frame does not exist in one or more of the domains, a common frame may be defined and generated, for example, to sync the plurality of sniffer streams.

In some demonstrative embodiments, controller 212 (FIG. 2) may be configured to perform Multi-channel sniffing, e.g., compared to sniffers that can only operate over a single channel, e.g., as described above.

In some demonstrative embodiments, controller 212 (FIG. 2) may be configured to perform Multi-protocol sniffing, e.g., compared to sniffers that can only operate over a single protocol. For example, frames of Wi-Fi and frames of BT may be captured simultaneously and/or may be displayed in a single synchronized output stream, e.g., as described above.

In some demonstrative embodiments, controller 212 (FIG. 2) may be configured to perform Multi-network sniffing, e.g., compared to sniffers that operate over a given specific network, and are not able to unify and synchronize outputs of different networks, e.g., as described above.

In some demonstrative embodiments, controller 212 (FIG. 2) may enable to provide a user with a synchronized sniffer capture, which may includes all frames, e.g., even when using a single sniffer machine that may not be able to sniff HE MU frames for several STAs in parallel or any other multi-streams transmitted in a single transmission.

In some demonstrative embodiments, controller 212 (FIG. 2) may enable one or more scenarios, e.g., in addition to or instead of the capturing and synchronizing of the multi-streams. For example, by scattering several wireless sniffers over a lab, the user may be able to monitor everything going over the air, even over different channels, networks, protocols and/or the like.

In some demonstrative embodiments, controller 212 (FIG. 2) may enable to perform physically mapping of locations of all transmitters in an area, for example, by triangulating a position of each transmitter, e.g., based on time differences it takes a frame to reach several wireless sniffers. This may implement mechanisms suitable for first syncing of clocks on distributed systems.

Figure 5:
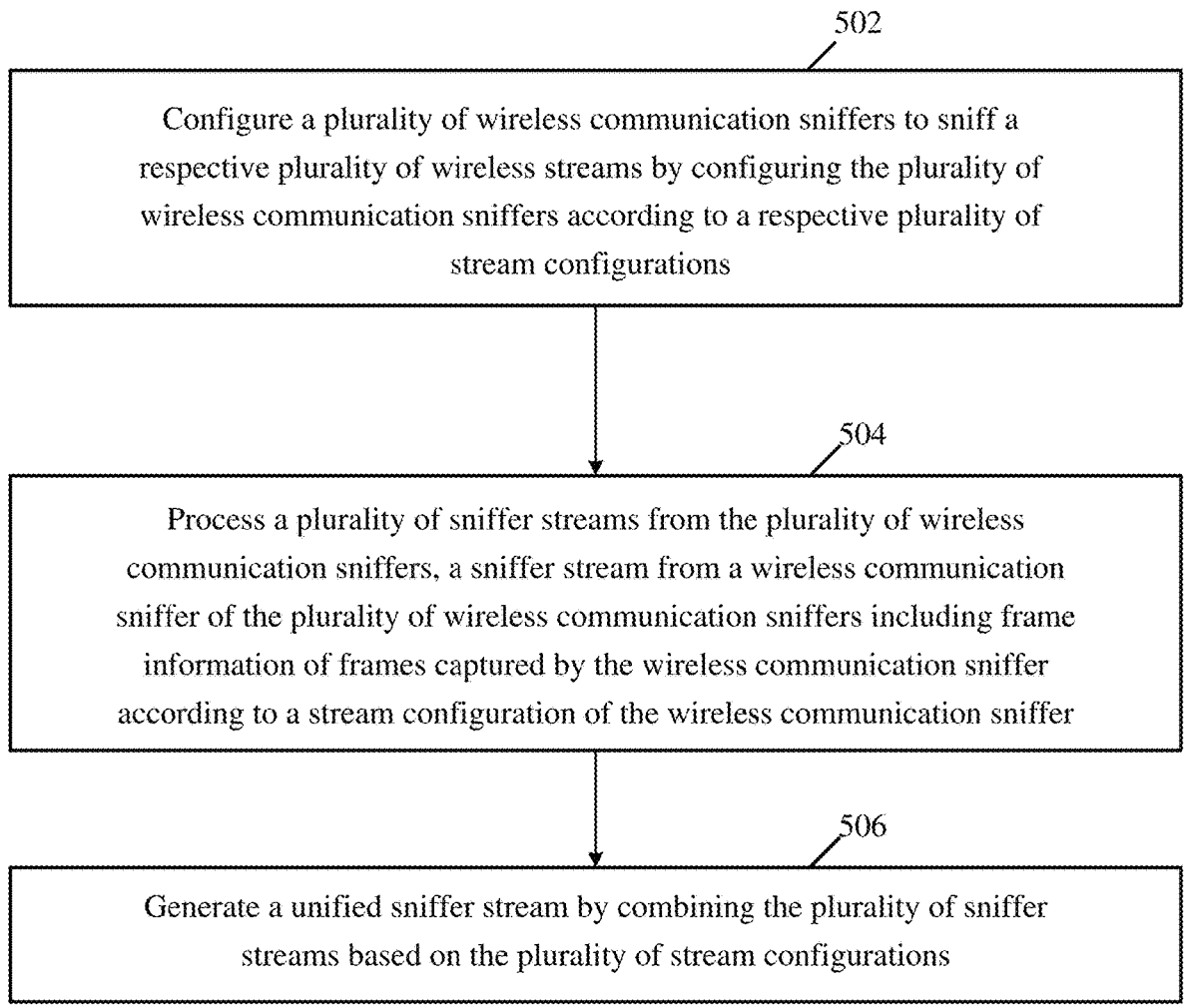
FIG. 5 is a schematic flow-chart illustration of a method of a wireless communication multi-stream sniffer, in accordance with some demonstrative embodiments.

Reference is made to FIG. 5, which schematically illustrates a method of a wireless communication multi-stream sniffer, in accordance with some demonstrative embodiments. For example, one or more of the operations of the method of FIG. 5 may be performed by one or more elements of a system, e.g., system 100 (FIG. 1), for example, a computing system, e.g., computing system 104 (FIG. 1), a processor, e.g., processor 185 (FIG. 1), and/or wireless communication multi-stream sniffer, e.g., wireless communication multi-stream sniffer 102 (FIG. 1).

As indicated at block 502, the method may include configuring a plurality of wireless communication sniffers to sniff a respective plurality of wireless streams by configuring the plurality of wireless communication sniffers according to a respective plurality of stream configurations. For example, wireless communication multi-stream sniffer 102 (FIG. 1) may configure the plurality of wireless communication sniffers 140 (FIG. 1) to sniff the respective plurality of wireless streams by configuring the plurality of wireless communication sniffers according to the respective plurality of stream configurations, e.g., as described above.

As indicated at block 504, the method may include processing a plurality of sniffer streams from the plurality of wireless communication sniffers, a sniffer stream from a wireless communication sniffer of the plurality of wireless communication sniffers including frame information of frames captured by the wireless communication sniffer according to a stream configuration of the wireless communication sniffer. For example, wireless communication multi-stream sniffer 102 (FIG. 1) may process the plurality of sniffer streams 141 (FIG. 1) from the plurality of wireless communication sniffers 140 (FIG. 1), the sniffer stream 143 (FIG. 1) from wireless communication sniffer 142 (FIG. 1) may include frame information of frames captured by wireless communication sniffer 142 (FIG. 1) according to a stream configuration of the wireless communication sniffer 142 (FIG. 1), e.g., as described above.

As indicated at block 506, the method may include generating a unified sniffer stream by combining the plurality of sniffer streams based on the plurality of stream configurations. For example, wireless communication multi-stream sniffer 102 (FIG. 1) may generate the unified sniffer stream 115 (FIG. 1) by combining the plurality of sniffer streams 141 (FIG. 1) based on the plurality of stream configurations, e.g., as described above.

Figure 6:
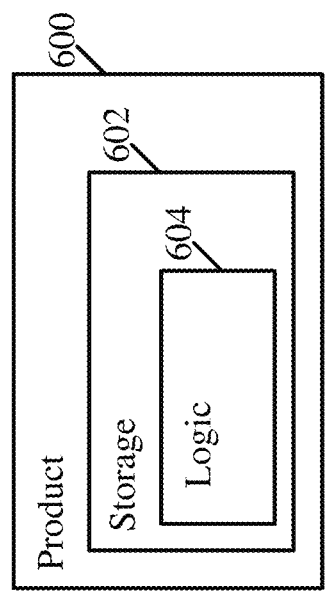
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at computing system 104 (FIG. 1), processor 185 (FIG. 1), and/or wireless communication multi-stream sniffer 102 (FIG. 1), to cause computing system 104 (FIG. 1), processor 185 (FIG. 1), and/or wireless communication multi-stream sniffer 102 (FIG. 1) to perform, trigger and/or implement one or more operations and/or functionalities, and/or to perform, trigger and/or implement one or more operations and/or functionalities described with reference to the FIGS. 1, 2, 3, 4 and/or 5, and/or one or more operations described herein. The phrases "non-transitory machine-readable medium" and "computer-readable non-transitory storage media" are directed to include all computer-readable media, with the sole exception being a transitory propagating signal.

In some demonstrative embodiments, product 600 and/or machine-readable storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a product comprising one or more tangible computer-readable non-transitory storage media comprising computer-executable instructions operable to, when executed by at least one processor, enable the at least one processor to cause a wireless communication multi-stream sniffer to configure a plurality of wireless communication sniffers to sniff a respective plurality of wireless streams by configuring the plurality of wireless communication sniffers according to a respective plurality of stream configurations; process a plurality of sniffer streams from the plurality of wireless communication sniffers, a sniffer stream from a wireless communication sniffer of the plurality of wireless communication sniffers comprising frame information of frames captured by the wireless communication sniffer according to a stream configuration of the wireless communication sniffer; and generate a unified sniffer stream by combining the plurality of sniffer streams based on the plurality of stream configurations.

Example 2 includes the subject matter of Example 1, and optionally, wherein the instructions, when executed, cause the wireless communication multi-stream sniffer to determine a time-base based on a first stream of the plurality of sniffer streams, to determine for one or more second streams of the plurality of sniffer streams one or more respective time correction factors relative to the time-base, and to combine the plurality of sniffer streams into the unified sniffer stream based on the one or more time correction factors.

Example 3 includes the subject matter of Example 2, and optionally, wherein the instructions, when executed, cause the wireless communication multi-stream sniffer to identify a common frame, which is included in the first stream and in a second stream of the one or more second streams, and to determine a time correction factor for the second stream based on a difference between a first timestamp of the common frame in the first stream and a second timestamp of the common frame in the second stream.

Example 4 includes the subject matter of Example 3, and optionally, wherein the instructions, when executed, cause the wireless communication multi-stream sniffer to determine an adjusted timestamp of a frame of the second sniffer stream based on the time correction factor, and to insert the frame of the second sniffer stream into the unified sniffer stream at a location based on the adjusted timestamp of the frame.

Example 5 includes the subject matter of Example 3 or 4, and optionally, wherein the instructions, when executed, cause the wireless communication multi-stream sniffer to identify a subsequent common frame, which is included in the first stream and in the second stream, and to update the time correction factor for the second stream based on a difference between a first timestamp of the subsequent common frame in the first stream and a second timestamp of the subsequent common frame in the second stream.

Example 6 includes the subject matter of any one of Examples 3-5, and optionally, wherein the common frame comprises a beacon frame.

Example 7 includes the subject matter of any one of Examples 1-6, and optionally, wherein the instructions, when executed, cause the wireless communication multi-stream sniffer to identify in a first sniffer stream of the plurality of sniffer streams a duplicate frame which is a duplicate of a frame from a second sniffer stream, and to discard the duplicate frame.

Example 8 includes the subject matter of any one of Examples 1-7, and optionally, wherein the instructions, when executed, cause the wireless communication multi-stream sniffer to configure a first wireless communication sniffer of the plurality of wireless communication sniffers to sniff a first user stream of a multi-user (MU) transmission, to configure a second wireless communication sniffer of the plurality of wireless communication sniffers to sniff a second user stream of the MU transmission, and to generate the unified sniffer stream comprising the first user stream and the second user stream.

Example 9 includes the subject matter of any one of Examples 1-8, and optionally, wherein the instructions, when executed, cause the wireless communication multi-stream sniffer to configure a first wireless communication sniffer of the plurality of wireless communication sniffers to capture one or more first frames over a first wireless communication channel, to configure a second wireless communication sniffer of the plurality of wireless communication sniffers to capture one or more second frames over a second wireless communication channel different from the first wireless communication channel, and to generate the unified sniffer stream comprising the one or more first frames captured over the first wireless communication channel and the one or more second frames captured over the second wireless communication channel.

Example 10 includes the subject matter of any one of Examples 1-9, and optionally, wherein the instructions, when executed, cause the wireless communication multi-stream sniffer to configure a first wireless communication sniffer of the plurality of wireless communication sniffers to capture one or more first frames over a first frequency band, to configure a second wireless communication sniffer of the plurality of wireless communication sniffers to capture one or more second frames over a second frequency band different from the first frequency band, and to generate the unified sniffer stream comprising the one or more first frames captured over the first frequency band and the one or more second frames captured over the second frequency band.

Example 11 includes the subject matter of any one of Examples 1-10, and optionally, wherein the instructions, when executed, cause the wireless communication multi-stream sniffer to configure a first wireless communication sniffer of the plurality of wireless communication sniffers to capture one or more first frames of a first wireless communication protocol, to configure a second wireless communication sniffer of the plurality of wireless communication sniffers to capture one or more second frames of a second wireless communication protocol different from the first wireless communication protocol, and to generate the unified sniffer stream comprising the one or more first frames of the first wireless communication protocol and the one or more second frames of the second wireless communication protocol.

Example 12 includes the subject matter of any one of Examples 1-11, and optionally, wherein the instructions, when executed, cause the wireless communication multi-stream sniffer to configure a first wireless communication sniffer of the plurality of wireless communication sniffers to capture one or more first frames of a first wireless communication network, to configure a second wireless communication sniffer of the plurality of wireless communication sniffers to capture one or more second frames of a second wireless communication network different from the first wireless communication network, and to generate the unified sniffer stream comprising the one or more first frames of the first wireless communication network and the one or more second frames of the second wireless communication network.

Example 13 includes the subject matter of any one of Examples 1-12, and optionally, wherein the instructions, when executed, cause the wireless communication multi-stream sniffer to configure the wireless communication sniffer according to the stream configuration by providing to the wireless communication sniffer one or more attributes of frames to be captured by the wireless communication sniffer.

Example 14 includes the subject matter of Example 13, and optionally, wherein the one or more attributes comprise an identifier of a wireless communication station (STA) to receive the frames.

Example 15 includes the subject matter of Example 14, and optionally, wherein the one or more attributes comprise an Association Identifier (ID) (AID) of the STA.

Example 16 includes the subject matter of any one of Examples 13-15, and optionally, wherein the one or more attributes comprise one or more parameters of a wireless communication channel over which the frames are to be captured.

Example 17 includes the subject matter of any one of Examples 13-16, and optionally, wherein the one or more attributes comprise one or more parameters of a wireless frequency band of the frames to be captured.

Example 18 includes the subject matter of any one of Examples 13-17, and optionally, wherein the one or more attributes comprise one or more parameters of a wireless communication protocol of the frames to be captured.

Example 19 includes the subject matter of any one of Examples 13-18, and optionally, wherein the one or more attributes comprise one or more parameters of a wireless network of the frames to be captured.

Example 20 includes the subject matter of any one of Examples 1-19, and optionally, wherein the instructions, when executed, cause the wireless communication multi-stream sniffer to communicate with one or more of the wireless communication sniffers via a communication network.

Example 21 includes a method to be performed at a wireless communication multi-stream sniffer, the method comprising configuring a plurality of wireless communication sniffers to sniff a respective plurality of wireless streams by configuring the plurality of wireless communication sniffers according to a respective plurality of stream configurations; processing a plurality of sniffer streams from the plurality of wireless communication sniffers, a sniffer stream from a wireless communication sniffer of the plurality of wireless communication sniffers comprising frame information of frames captured by the wireless communication sniffer according to a stream configuration of the wireless communication sniffer; and generating a unified sniffer stream by combining the plurality of sniffer streams based on the plurality of stream configurations.

Example 22 includes the subject matter of Example 21, and optionally, comprising determining a time-base based on a first stream of the plurality of sniffer streams, determining for one or more second streams of the plurality of sniffer streams one or more respective time correction factors relative to the time-base, and combining the plurality of sniffer streams into the unified sniffer stream based on the one or more time correction factors.

Example 23 includes the subject matter of Example 22, and optionally, comprising identifying a common frame, which is included in the first stream and in a second stream of the one or more second streams, and determining a time correction factor for the second stream based on a difference between a first timestamp of the common frame in the first stream and a second timestamp of the common frame in the second stream.

Example 24 includes the subject matter of Example 23, and optionally, comprising determining an adjusted timestamp of a frame of the second sniffer stream based on the time correction factor, and inserting the frame of the second sniffer stream into the unified sniffer stream at a location based on the adjusted timestamp of the frame.

Example 25 includes the subject matter of Example 23 or 24, and optionally, comprising identifying a subsequent common frame, which is included in the first stream and in the second stream, and updating the time correction factor for the second stream based on a difference between a first timestamp of the subsequent common frame in the first stream and a second timestamp of the subsequent common frame in the second stream.

Example 26 includes the subject matter of any one of Examples 23-25, and optionally, wherein the common frame comprises a beacon frame.

Example 27 includes the subject matter of any one of Examples 21-26, and optionally, comprising identifying in a first sniffer stream of the plurality of sniffer streams a duplicate frame which is a duplicate of a frame from a second sniffer stream, and discarding the duplicate frame.

Example 28 includes the subject matter of any one of Examples 21-27, and optionally, comprising configuring a first wireless communication sniffer of the plurality of wireless communication sniffers to sniff a first user stream of a multi-user (MU) transmission, configuring a second wireless communication sniffer of the plurality of wireless communication sniffers to sniff a second user stream of the MU transmission, and generating the unified sniffer stream comprising the first user stream and the second user stream.

Example 29 includes the subject matter of any one of Examples 21-28, and optionally, comprising configuring a first wireless communication sniffer of the plurality of wireless communication sniffers to capture one or more first frames over a first wireless communication channel, configuring a second wireless communication sniffer of the plurality of wireless communication sniffers to capture one or more second frames over a second wireless communication channel different from the first wireless communication channel, and generating the unified sniffer stream comprising the one or more first frames captured over the first wireless communication channel and the one or more second frames captured over the second wireless communication channel.

Example 30 includes the subject matter of any one of Examples 21-29, and optionally, comprising configuring a first wireless communication sniffer of the plurality of wireless communication sniffers to capture one or more first frames over a first frequency band, configuring a second wireless communication sniffer of the plurality of wireless communication sniffers to capture one or more second frames over a second frequency band different from the first frequency band, and generating the unified sniffer stream comprising the one or more first frames captured over the first frequency band and the one or more second frames captured over the second frequency band.

Example 31 includes the subject matter of any one of Examples 21-30, and optionally, comprising configuring a first wireless communication sniffer of the plurality of wireless communication sniffers to capture one or more first frames of a first wireless communication protocol, configuring a second wireless communication sniffer of the plurality of wireless communication sniffers to capture one or more second frames of a second wireless communication protocol different from the first wireless communication protocol, and generating the unified sniffer stream comprising the one or more first frames of the first wireless communication protocol and the one or more second frames of the second wireless communication protocol.

Example 32 includes the subject matter of any one of Examples 21-31, and optionally, comprising configuring a first wireless communication sniffer of the plurality of wireless communication sniffers to capture one or more first frames of a first wireless communication network, configuring a second wireless communication sniffer of the plurality of wireless communication sniffers to capture one or more second frames of a second wireless communication network different from the first wireless communication network, and generating the unified sniffer stream comprising the one or more first frames of the first wireless communication network and the one or more second frames of the second wireless communication network.

Example 33 includes the subject matter of any one of Examples 21-32, and optionally, comprising configuring the wireless communication sniffer according to the stream configuration by providing to the wireless communication sniffer one or more attributes of frames to be captured by the wireless communication sniffer.

Example 34 includes the subject matter of Example 33, and optionally, wherein the one or more attributes comprise an identifier of a wireless communication station (STA) to receive the frames.

Example 35 includes the subject matter of Example 34, and optionally, wherein the one or more attributes comprise an Association Identifier (ID) (AID) of the STA.

Example 36 includes the subject matter of any one of Examples 33-35, and optionally, wherein the one or more attributes comprise one or more parameters of a wireless communication channel over which the frames are to be captured.

Example 37 includes the subject matter of any one of Examples 33-36, and optionally, wherein the one or more attributes comprise one or more parameters of a wireless frequency band of the frames to be captured.

Example 38 includes the subject matter of any one of Examples 33-37, and optionally, wherein the one or more attributes comprise one or more parameters of a wireless communication protocol of the frames to be captured.

Example 39 includes the subject matter of any one of Examples 33-38, and optionally, wherein the one or more attributes comprise one or more parameters of a wireless network of the frames to be captured.

Example 40 includes the subject matter of any one of Examples 21-39, and optionally, comprising communicating with one or more of the wireless communication sniffers via a communication network.

Example 41 includes an apparatus of a wireless communication multi-stream sniffer, the apparatus comprising means for configuring a plurality of wireless communication sniffers to sniff a respective plurality of wireless streams by configuring the plurality of wireless communication sniffers according to a respective plurality of stream configurations; means for processing a plurality of sniffer streams from the plurality of wireless communication sniffers, a sniffer stream from a wireless communication sniffer of the plurality of wireless communication sniffers comprising frame information of frames captured by the wireless communication sniffer according to a stream configuration of the wireless communication sniffer; and means for generating a unified sniffer stream by combining the plurality of sniffer streams based on the plurality of stream configurations.

Example 42 includes the subject matter of Example 41, and optionally, comprising means for determining a time-base based on a first stream of the plurality of sniffer streams, determining for one or more second streams of the plurality of sniffer streams one or more respective time correction factors relative to the time-base, and combining the plurality of sniffer streams into the unified sniffer stream based on the one or more time correction factors.

Example 43 includes the subject matter of Example 42, and optionally, comprising means for identifying a common frame, which is included in the first stream and in a second stream of the one or more second streams, and determining a time correction factor for the second stream based on a difference between a first timestamp of the common frame in the first stream and a second timestamp of the common frame in the second stream.

Example 44 includes the subject matter of Example 43, and optionally, comprising means for determining an adjusted timestamp of a frame of the second sniffer stream based on the time correction factor, and inserting the frame of the second sniffer stream into the unified sniffer stream at a location based on the adjusted timestamp of the frame.

Example 45 includes the subject matter of Example 43 or 44, and optionally, comprising means for identifying a subsequent common frame, which is included in the first stream and in the second stream, and updating the time correction factor for the second stream based on a difference between a first timestamp of the subsequent common frame in the first stream and a second timestamp of the subsequent common frame in the second stream.

Example 46 includes the subject matter of any one of Examples 43-45, and optionally, wherein the common frame comprises a beacon frame.

Example 47 includes the subject matter of any one of Examples 41-46, and optionally, comprising means for identifying in a first sniffer stream of the plurality of sniffer streams a duplicate frame which is a duplicate of a frame from a second sniffer stream, and discarding the duplicate frame.

Example 48 includes the subject matter of any one of Examples 41-47, and optionally, comprising means for configuring a first wireless communication sniffer of the plurality of wireless communication sniffers to sniff a first user stream of a multi-user (MU) transmission, configuring a second wireless communication sniffer of the plurality of wireless communication sniffers to sniff a second user stream of the MU transmission, and generating the unified sniffer stream comprising the first user stream and the second user stream.

Example 49 includes the subject matter of any one of Examples 41-48, and optionally, comprising means for configuring a first wireless communication sniffer of the plurality of wireless communication sniffers to capture one or more first frames over a first wireless communication channel, configuring a second wireless communication sniffer of the plurality of wireless communication sniffers to capture one or more second frames over a second wireless communication channel different from the first wireless communication channel, and generating the unified sniffer stream comprising the one or more first frames captured over the first wireless communication channel and the one or more second frames captured over the second wireless communication channel.

Example 50 includes the subject matter of any one of Examples 41-49, and optionally, comprising means for configuring a first wireless communication sniffer of the plurality of wireless communication sniffers to capture one or more first frames over a first frequency band, configuring a second wireless communication sniffer of the plurality of wireless communication sniffers to capture one or more second frames over a second frequency band different from the first frequency band, and generating the unified sniffer stream comprising the one or more first frames captured over the first frequency band and the one or more second frames captured over the second frequency band.

Example 51 includes the subject matter of any one of Examples 41-50, and optionally, comprising means for configuring a first wireless communication sniffer of the plurality of wireless communication sniffers to capture one or more first frames of a first wireless communication protocol, configuring a second wireless communication sniffer of the plurality of wireless communication sniffers to capture one or more second frames of a second wireless communication protocol different from the first wireless communication protocol, and generating the unified sniffer stream comprising the one or more first frames of the first wireless communication protocol and the one or more second frames of the second wireless communication protocol.

Example 52 includes the subject matter of any one of Examples 41-51, and optionally, comprising means for configuring a first wireless communication sniffer of the plurality of wireless communication sniffers to capture one or more first frames of a first wireless communication network, configuring a second wireless communication sniffer of the plurality of wireless communication sniffers to capture one or more second frames of a second wireless communication network different from the first wireless communication network, and generating the unified sniffer stream comprising the one or more first frames of the first wireless communication network and the one or more second frames of the second wireless communication network.

Example 53 includes the subject matter of any one of Examples 41-52, and optionally, comprising means for configuring the wireless communication sniffer according to the stream configuration by providing to the wireless communication sniffer one or more attributes of frames to be captured by the wireless communication sniffer.

Example 54 includes the subject matter of Example 53, and optionally, wherein the one or more attributes comprise an identifier of a wireless communication station (STA) to receive the frames.

Example 55 includes the subject matter of Example 54, and optionally, wherein the one or more attributes comprise an Association Identifier (ID) (AID) of the STA.

Example 56 includes the subject matter of any one of Examples 53-55, and optionally, wherein the one or more attributes comprise one or more parameters of a wireless communication channel over which the frames are to be captured.

Example 57 includes the subject matter of any one of Examples 53-56, and optionally, wherein the one or more attributes comprise one or more parameters of a wireless frequency band of the frames to be captured.

Example 58 includes the subject matter of any one of Examples 53-57, and optionally, wherein the one or more attributes comprise one or more parameters of a wireless communication protocol of the frames to be captured.

Example 59 includes the subject matter of any one of Examples 53-58, and optionally, wherein the one or more attributes comprise one or more parameters of a wireless network of the frames to be captured.

Example 60 includes the subject matter of any one of Examples 41-59, and optionally, comprising means for communicating with one or more of the wireless communication sniffers via a communication network.

Example 61 includes a computing system comprising a network interface to communicate via a communication network; a memory having stored thereon instructions; and a processor to execute the instructions, the instructions, when executed by the processor, to result in a wireless communication multi-stream sniffer configured to configure, via the communication network, a plurality of wireless communication sniffers to sniff a respective plurality of wireless streams by configuring the plurality of wireless communication sniffers according to a respective plurality of stream configurations; process a plurality of sniffer streams received from the plurality of wireless communication sniffers via the communication network, a sniffer stream from a wireless communication sniffer of the plurality of wireless communication sniffers comprising frame information of frames captured by the wireless communication sniffer according to a stream configuration of the wireless communication sniffer; and generate a unified sniffer stream by combining the plurality of sniffer streams based on the plurality of stream configurations.

Example 62 includes the subject matter of Example 61, and optionally, wherein the wireless communication multi-stream sniffer is configured to determine a time-base based on a first stream of the plurality of sniffer streams, to determine for one or more second streams of the plurality of sniffer streams one or more respective time correction factors relative to the time-base, and to combine the plurality of sniffer streams into the unified sniffer stream based on the one or more time correction factors.

Example 63 includes the subject matter of Example 62, and optionally, wherein the wireless communication multi-stream sniffer is configured to identify a common frame, which is included in the first stream and in a second stream of the one or more second streams, and to determine a time correction factor for the second stream based on a difference between a first timestamp of the common frame in the first stream and a second timestamp of the common frame in the second stream.

Example 64 includes the subject matter of Example 63, and optionally, wherein the wireless communication multi-stream sniffer is configured to determine an adjusted timestamp of a frame of the second sniffer stream based on the time correction factor, and to insert the frame of the second sniffer stream into the unified sniffer stream at a location based on the adjusted timestamp of the frame.

Example 65 includes the subject matter of Example 63 or 64, and optionally, wherein the wireless communication multi-stream sniffer is configured to identify a subsequent common frame, which is included in the first stream and in the second stream, and to update the time correction factor for the second stream based on a difference between a first timestamp of the subsequent common frame in the first stream and a second timestamp of the subsequent common frame in the second stream.

Example 66 includes the subject matter of any one of Examples 63-65, and optionally, wherein the common frame comprises a beacon frame.

Example 67 includes the subject matter of any one of Examples 61-66, and optionally, wherein the wireless communication multi-stream sniffer is configured to identify in a first sniffer stream of the plurality of sniffer streams a duplicate frame which is a duplicate of a frame from a second sniffer stream, and to discard the duplicate frame.

Example 68 includes the subject matter of any one of Examples 61-67, and optionally, wherein the wireless communication multi-stream sniffer is configured to configure a first wireless communication sniffer of the plurality of wireless communication sniffers to sniff a first user stream of a multi-user (MU) transmission, to configure a second wireless communication sniffer of the plurality of wireless communication sniffers to sniff a second user stream of the MU transmission, and to generate the unified sniffer stream comprising the first user stream and the second user stream.

Example 69 includes the subject matter of any one of Examples 61-68, and optionally, wherein the wireless communication multi-stream sniffer is configured to configure a first wireless communication sniffer of the plurality of wireless communication sniffers to capture one or more first frames over a first wireless communication channel, to configure a second wireless communication sniffer of the plurality of wireless communication sniffers to capture one or more second frames over a second wireless communication channel different from the first wireless communication channel, and to generate the unified sniffer stream comprising the one or more first frames captured over the first wireless communication channel and the one or more second frames captured over the second wireless communication channel.

Example 70 includes the subject matter of any one of Examples 61-69, and optionally, wherein the wireless communication multi-stream sniffer is configured to configure a first wireless communication sniffer of the plurality of wireless communication sniffers to capture one or more first frames over a first frequency band, to configure a second wireless communication sniffer of the plurality of wireless communication sniffers to capture one or more second frames over a second frequency band different from the first frequency band, and to generate the unified sniffer stream comprising the one or more first frames captured over the first frequency band and the one or more second frames captured over the second frequency band.

Example 71 includes the subject matter of any one of Examples 61-70, and optionally, wherein the wireless communication multi-stream sniffer is configured to configure a first wireless communication sniffer of the plurality of wireless communication sniffers to capture one or more first frames of a first wireless communication protocol, to configure a second wireless communication sniffer of the plurality of wireless communication sniffers to capture one or more second frames of a second wireless communication protocol different from the first wireless communication protocol, and to generate the unified sniffer stream comprising the one or more first frames of the first wireless communication protocol and the one or more second frames of the second wireless communication protocol.

Example 72 includes the subject matter of any one of Examples 61-71, and optionally, wherein the wireless communication multi-stream sniffer is configured to configure a first wireless communication sniffer of the plurality of wireless communication sniffers to capture one or more first frames of a first wireless communication network, to configure a second wireless communication sniffer of the plurality of wireless communication sniffers to capture one or more second frames of a second wireless communication network different from the first wireless communication network, and to generate the unified sniffer stream comprising the one or more first frames of the first wireless communication network and the one or more second frames of the second wireless communication network.

Example 73 includes the subject matter of any one of Examples 61-72, and optionally, wherein the wireless communication multi-stream sniffer is configured to configure the wireless communication sniffer according to the stream configuration by providing to the wireless communication sniffer one or more attributes of frames to be captured by the wireless communication sniffer.

Example 74 includes the subject matter of Example 73, and optionally, wherein the one or more attributes comprise an identifier of a wireless communication station (STA) to receive the frames.

Example 75 includes the subject matter of Example 74, and optionally, wherein the one or more attributes comprise an Association Identifier (ID) (AID) of the STA.

Example 76 includes the subject matter of any one of Examples 73-75, and optionally, wherein the one or more attributes comprise one or more parameters of a wireless communication channel over which the frames are to be captured.

Example 77 includes the subject matter of any one of Examples 73-76, and optionally, wherein the one or more attributes comprise one or more parameters of a wireless frequency band of the frames to be captured.

Example 78 includes the subject matter of any one of Examples 73-77, and optionally, wherein the one or more attributes comprise one or more parameters of a wireless communication protocol of the frames to be captured.

Example 79 includes the subject matter of any one of Examples 73-78, and optionally, wherein the one or more attributes comprise one or more parameters of a wireless network of the frames to be captured.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A product comprising one or more tangible computer-readable non-transitory storage media comprising computer-executable instructions operable to, when executed by at least one processor, enable the at least one processor to cause a wireless communication multi-stream sniffer to:

configure a plurality of wireless communication sniffers to sniff a respective plurality of wireless streams by configuring the plurality of wireless communication sniffers according to a respective plurality of stream configurations;

process a plurality of sniffer streams from the plurality of wireless communication sniffers, a sniffer stream from a wireless communication sniffer of the plurality of wireless communication sniffers comprising frame information of frames captured by the wireless communication sniffer according to a stream configuration of the wireless communication sniffer; and generate a unified sniffer stream by combining the plurality of sniffer streams based on the plurality of stream configurations, wherein the instructions, when executed, cause the wireless communication multi-stream sniffer to determine a time-base based on a first stream of the plurality of sniffer streams, to determine an adjusted timestamp of a frame of a second stream of the plurality of sniffer streams based on a time correction factor for the second stream relative to the time-base, and to insert the frame of the second stream into the unified sniffer stream at a location based on the adjusted timestamp of the frame of the second stream.

2. The product of claim 1, wherein the instructions, when executed, cause the wireless communication multi-stream sniffer to identify a common frame, which is included in the first stream and in the second stream, and to determine the time correction factor for the second stream based on a difference between a first timestamp of the common frame in the first stream and a second timestamp of the common frame in the second stream.

3. The product of claim 2, wherein the instructions, when executed, cause the wireless communication multi-stream sniffer to identify a subsequent common frame, which is included in the first stream and in the second stream, and to update the time correction factor for the second stream based on a difference between a first timestamp of the subsequent common frame in the first stream and a second timestamp of the subsequent common frame in the second stream.

4. The product of claim 2, wherein the common frame comprises a beacon frame.

5. The product of claim 1, wherein the instructions, when executed, cause the wireless communication multi-stream sniffer to identify in a first particular sniffer stream of the plurality of sniffer streams a duplicate frame which is a duplicate of a frame from a second particular sniffer stream, and to discard the duplicate frame.

6. The product of claim 1, wherein the instructions, when executed, cause the wireless communication multi-stream sniffer to configure a first wireless communication sniffer of the plurality of wireless communication sniffers to sniff a first user stream of a multi-user (MU) transmission, to configure a second wireless communication sniffer of the plurality of wireless communication sniffers to sniff a second user stream of the MU transmission, and to generate the unified sniffer stream comprising the first user stream and the second user stream.

7. The product of claim 1, wherein the instructions, when executed, cause the wireless communication multi-stream sniffer to configure a first wireless communication sniffer of the plurality of wireless communication sniffers to capture one or more first frames over a first wireless communication channel, to configure a second wireless communication sniffer of the plurality of wireless communication sniffers to capture one or more second frames over a second wireless communication channel different from the first wireless communication channel, and to generate the unified sniffer stream comprising the one or more first frames captured over the first wireless communication channel and the one or more second frames captured over the second wireless communication channel.

8. The product of claim 1, wherein the instructions, when executed, cause the wireless communication multi-stream sniffer to configure a first wireless communication sniffer of the plurality of wireless communication sniffers to capture one or more first frames over a first frequency band, to configure a second wireless communication sniffer of the plurality of wireless communication sniffers to capture one or more second frames over a second frequency band different from the first frequency band, and to generate the unified sniffer stream comprising the one or more first frames captured over the first frequency band and the one or more second frames captured over the second frequency band.

9. The product of claim 1, wherein the instructions, when executed, cause the wireless communication multi-stream sniffer to configure a first wireless communication sniffer of the plurality of wireless communication sniffers to capture one or more first frames of a first wireless communication protocol, to configure a second wireless communication sniffer of the plurality of wireless communication sniffers to capture one or more second frames of a second wireless communication protocol different from the first wireless communication protocol, and to generate the unified sniffer stream comprising the one or more first frames of the first wireless communication protocol and the one or more second frames of the second wireless communication protocol.

10. The product of claim 1, wherein the instructions, when executed, cause the wireless communication multi-stream sniffer to configure a first wireless communication sniffer of the plurality of wireless communication sniffers to capture one or more first frames of a first wireless communication network, to configure a second wireless communication sniffer of the plurality of wireless communication sniffers to capture one or more second frames of a second wireless communication network different from the first wireless communication network, and to generate the unified sniffer stream comprising the one or more first frames of the first wireless communication network and the one or more second frames of the second wireless communication network.

11. The product of claim 1, wherein the instructions, when executed, cause the wireless communication multi-stream sniffer to configure the wireless communication sniffer according to the stream configuration by providing to the wireless communication sniffer one or more attributes of frames to be captured by the wireless communication sniffer.

12. The product of claim 11, wherein the one or more attributes comprise an identifier of a wireless communication station (STA) to receive the frames.

13. The product of claim 12, wherein the one or more attributes comprise an Association Identifier (ID) (AID) of the STA.

14. The product of claim 11, wherein the one or more attributes comprise one or more parameters of a wireless communication channel over which the frames are to be captured.

15. The product of claim 11, wherein the one or more attributes comprise one or more parameters of a wireless frequency band of the frames to be captured.

16. The product of claim 11, wherein the one or more attributes comprise one or more parameters of a wireless communication protocol of the frames to be captured.

17. The product of claim 11, wherein the one or more attributes comprise one or more parameters of a wireless network of the frames to be captured.

18. The product of claim 1, wherein the instructions, when executed, cause the wireless communication multi-stream sniffer to communicate with one or more of the wireless communication sniffers via a communication network.

19. An apparatus of a wireless communication multi-stream sniffer, the apparatus comprising:
    means for configuring a plurality of wireless communication sniffers to sniff a respective plurality of wireless streams by configuring the plurality of wireless communication sniffers according to a respective plurality of stream configurations;
    means for processing a plurality of sniffer streams from the plurality of wireless communication sniffers, a sniffer stream from a wireless communication sniffer of the plurality of wireless communication sniffers comprising frame information of frames captured by the wireless communication sniffer according to a stream configuration of the wireless communication sniffer; and
    means for generating a unified sniffer stream by combining the plurality of sniffer streams based on the plurality of stream configurations, wherein combining the plurality of sniffer streams comprises determining a time-base based on a first stream of the plurality of sniffer streams, determining an adjusted timestamp of a frame of a second stream of the plurality of sniffer streams based on a time correction factor for the second stream relative to the time-base, and inserting the frame of the second stream into the unified sniffer stream at a location based on the adjusted timestamp of the frame of the second stream.

20. The apparatus of claim 19 comprising means for determining the time correction factor for the second stream by identifying a common frame, which is included in the first stream and in the second stream, and determining the time correction factor for the second stream based on a difference between a first timestamp of the common frame in the first stream and a second timestamp of the common frame in the second stream.

21. A computing system comprising:
    a network interface to communicate via a communication network;
    a memory having stored thereon instructions; and
    a processor to execute the instructions, the instructions, when executed by said processor, to result in a wireless communication multi-stream sniffer configured to:
        configure, via the communication network, a plurality of wireless communication sniffers to sniff a respective plurality of wireless streams by configuring the plurality of wireless communication sniffers according to a respective plurality of stream configurations;
        process a plurality of sniffer streams received from the plurality of wireless communication sniffers via the communication network, a sniffer stream from a wireless communication sniffer of the plurality of wireless communication sniffers comprising frame information of frames captured by the wireless communication sniffer according to a stream configuration of the wireless communication sniffer; and
        generate a unified sniffer stream by combining the plurality of sniffer streams based on the plurality of stream configurations, wherein the wireless communication multi-stream sniffer is configured to determine a time-base based on a first stream of the plurality of sniffer streams, to determine an adjusted timestamp of a frame of a second stream of the plurality of sniffer streams based on a time correction factor for the second stream relative to the time-base, and to insert the frame of the second stream into the unified sniffer stream at a location based on the adjusted timestamp of the frame of the second stream.

22. The system of claim 21, wherein the wireless communication multi-stream sniffer is configured to identify a common frame, which is included in the first stream and in the second stream, and to determine the time correction factor for the second stream based on a difference between a first timestamp of the common frame in the first stream and a second timestamp of the common frame in the second stream.

23. The system of claim 21, wherein the wireless communication multi-stream sniffer is configured to configure a first wireless communication sniffer of the plurality of wireless communication sniffers to sniff a first user stream of a multi-user (MU) transmission, to configure a second wireless communication sniffer of the plurality of wireless communication sniffers to sniff a second user stream of the MU transmission, and to generate the unified sniffer stream comprising the first user stream and the second user stream.

* * * * *